(12) United States Patent
Acharya et al.

(10) Patent No.: US 11,197,493 B2
(45) Date of Patent: Dec. 14, 2021

(54) STABILIZED FAT SOLUBLE NUTRIENT COMPOSITIONS AND PROCESS FOR THE PREPARATION THEREOF

(71) Applicant: OmniActive Health Technologies Limited, Mumbai (IN)

(72) Inventors: Manutosh Acharya, Thane (IN); Pravin Nalawade, Thane (IN); Ravindra Thakare, Thane (IN); Chaitanya Desai, Thane (IN)

(73) Assignee: OmniActive Health Technologies Limited, Mumbai (IN)

( * ) Notice: Subject to any disclaimer, the term of this patent is extended or adjusted under 35 U.S.C. 154(b) by 323 days.

(21) Appl. No.: 16/128,968

(22) Filed: Sep. 12, 2018

(65) Prior Publication Data

US 2019/0075831 A1 Mar. 14, 2019

(30) Foreign Application Priority Data

Sep. 12, 2017 (IN) .............................. 201721032171

(51) Int. Cl.
| | | |
|---|---|---|
| *A23L 33/105* | (2016.01) | |
| *A23P 10/30* | (2016.01) | |
| *A23L 33/15* | (2016.01) | |
| *A23L 33/115* | (2016.01) | |

(52) U.S. Cl.
CPC .......... *A23L 33/105* (2016.08); *A23L 33/115* (2016.08); *A23L 33/15* (2016.08); *A23P 10/30* (2016.08); *A23V 2002/00* (2013.01); *A23V 2200/02* (2013.01); *A23V 2200/224* (2013.01); *A23V 2200/238* (2013.01); *A23V 2200/318* (2013.01); *A23V 2200/322* (2013.01); *A23V 2250/211* (2013.01); *A23V 2250/2112* (2013.01); *A23V 2250/314* (2013.01); *A23V 2250/5118* (2013.01); *A23V 2250/712* (2013.01); *A23V 2300/26* (2013.01)

(58) Field of Classification Search
CPC ...... A23L 33/105; A23L 33/15; A23L 33/115; A23V 2200/224; A23V 2002/00; A23V 2200/02; A23V 2200/238; A23V 2200/318; A23V 2200/322; A23V 2250/211; A23V 2250/2112; A23V 2250/314; A23V 2250/5118; A23V 2250/712; A23V 2300/26; A23P 10/30
USPC .................................................... 426/89, 103
See application file for complete search history.

(56) References Cited

U.S. PATENT DOCUMENTS

| | | |
|---|---|---|
| 3,998,753 A | 12/1976 | Antoshkiw et al. |
| 6,093,348 A | 7/2000 | Kowalsky et al. |
| 7,045,643 B2 | 5/2006 | Estrella De Castro et al. |
| 7,097,868 B2 | 8/2006 | Blatt et al. |
| 7,691,297 B2 | 4/2010 | Schaffner |
| 8,211,471 B2 | 7/2012 | Diguet et al. |
| 9,247,765 B2 | 2/2016 | Deshpande |
| 9,399,020 B2 | 7/2016 | Deshpande et al. |
| 9,981,899 B2 | 5/2018 | Ueda et al. |
| 2010/0112188 A1* | 5/2010 | Deshpande .......... A61K 9/5047 427/2.14 |
| 2017/0157054 A1 | 6/2017 | Beck et al. |

FOREIGN PATENT DOCUMENTS

EP 807431 A1 * 1/1999 ........... A61K 31/015

* cited by examiner

*Primary Examiner* — Jyoti Chawla
(74) *Attorney, Agent, or Firm* — Hamre, Schumann, Mueller & Larson, P.C.

(57) ABSTRACT

A stabilized composition of fat soluble nutrient(s) includes a water soluble polymer and at least one nutraceutically acceptable excipient. The composition can be in the form of significantly amorphous aqueous microparticulate mixtures or as a solid beadlet product. A process for preparation of a stabilized composition includes a fat soluble nutrient solubilized in an organic solvent embedded in an aqueous polymer phase by evaporation, so as to obtain an aqueous microparticulate mixture. This mixture is stable, soluble and can be formulated for end use or can be layered on inert core for example to obtain stable beadlet(s) for use in solid dosage forms. Such stabilized aqueous microparticulate and solid beadlet compositions exhibit good solubility and dispersibility. Stabilized compositions of fat soluble nutrients can be prepared using industrially convenient equipment and can be formulated as per requirement for use in health applications.

5 Claims, 7 Drawing Sheets

STABILIZED FAT SOLUBLE NUTRIENT COMPOSITIONS AND PROCESS FOR THE PREPARATION THEREOF

FIELD

Stabilized compositions of fat soluble nutrients and the process for the preparation thereof are described. More specifically, a stable composition herein comprises 1-50% by weight of fat soluble nutrients which can be obtained in the form of an intermediate microparticulate aqueous mixture, or in the form of a solid beadlet end product. The composition also comprises a water soluble polymer and at least one nutraceutically acceptable excipient. The composition can be further formulated in suitable dosage forms. In a process for preparation of a stabilized composition, a solution of fat soluble nutrients and at least one nutraceutically acceptable excipient in organic solvent is added to an aqueous polymer phase, homogenized, and subjected to evaporation to obtain an intermediate microparticulate aqueous mixture, which can be used as such or further formulated in solid beadlet forms. A stabilized end product in the form of a solid beadlet can be obtained by layering an intermediate microparticulate aqueous mixture on a suitable inert core. The compositions described herein are substantially free of organic solvent, significantly amorphous in nature and are stable during shelf life. Such stabilized intermediate aqueous microparticulate forms and end product solid beadlet compositions can be prepared using industrially convenient equipment and are useful for various health applications related to eye health, skin health and brain health.

BACKGROUND

A formulation of fat soluble nutrients represents a particular challenge because of their slight solubility in water and their chemical instability. There have been numerous attempts to provide formulations which, on the one hand, are stable and, on the other hand, show good bioavailability. There has been specific interest in preparing the formulations in solid as well as liquid forms, which can be administered as such or can be converted in suitable dosage forms for administration.

U.S. Pat. No. 9,247,765 relates to stable beadlets of lipophilic nutrients comprising an inert spherical core and a coating comprising lipophilic nutrient and a binding agent. The coating is prepared as a colloidal suspension by dispersing the lipophilic nutrient in a non-polar solvent, and then with addition of a polar solvent. The colloidal suspension is mixed with the binding agent and the coating is applied on inert core to get the beadlets.

U.S. Pat. No. 9,399,020 provides hydrophilic matrix beadlet compositions that include at least one fat soluble nutrient and an effective amount of cellulose polymer with low viscosity. It also provides a process for the preparation of the hydrophilic matrix composition by employing extrusion spheronization technique.

U.S. Pub No. 20170157054 relates to beadlet formulation of a pharmacological effective fat-soluble active ingredient with a high bioavailability, wherein said beadlet comprises fat soluble active ingredients, a protective colloid, an antioxidant, and a powder-catch agent. The beadlets exhibit an extinction E1/1 at a wavelength in the range of from 200 to 800 nm of ≥380 and tablet prepared from beadlets has an extrusion loss of less than or equal to 30%. The beadlets are prepared by powder-catch process.

U.S. Pat. No. 7,691,297 relates to starch-catch process for the manufacture of beadlet preparations of fat-soluble substances in a water-dispersible non-gelling sulfonated lignin matrix. The obtained beadlet comprising the matrix component are covered by an adhesive layer of starch.

U.S. Pat. No. 7,097,868 relates to a process for the preparation of microencapsulated lipophilic composition comprising: preparing an emulsion or suspension of surface active coated lipophilic particle in water or water miscible solvent or mixture thereof; mixing the emulsion in solution of alkali metal alginate; adding the obtained solution dropwise to a solution containing $Ca^{2+}$, thereby obtaining beadlets having a coating of calcium alginate, further coating the dried beadlets with cellulose derivatives, waxes, fats, proteins and polysaccharides to obtain microcapsule.

U.S. Pat. No. 6,093,348 relates to a process for the manufacture of a solid carotenoid powder containing carotenoid beadlets, the process comprising: melting an aqueous suspension containing carotenoid crystals, a surfactant, a protective colloid in a heat exchanger; homogenizing the melted aqueous carotenoid suspension to obtain a carotenoid emulsion; and converting the carotenoid emulsion into a dry powder by a spray process, thereby forming a solid carotenoid powder containing carotenoid beadlets having a matrix with a mean particle size of carotenoid particles within the beadlet matrix from 0.1 to 0.5 microns.

U.S. Pat. No. 8,211,471 describes a process for the production of cross-linked beadlets wherein an emulsion of a carotenoid and vitamin A, polyunsaturated fatty acid, an emulsifier and a reducing sugar is prepared and converted to droplets, where these droplets are coated with finely dispersed calcium silicate powder.

U.S. Pat. No. 7,045,643 relates to a process of obtaining a microcrystalline formulation based on lutein, or its esters of fatty acids, or mixtures thereof, comprising steps of dissolving lutein in a food-grade organic solvent in the presence of antioxidants or vegetable oils or both; emulsifying and microencapsulating the organic solution with an aqueous solution of modified starch; drying and coating the particles with aqueous solutions of sugars or modified starch.

U.S. Pat. No. 3,998,753 relates to a process for the preparation of a water-dispersible carotenoid-containing beadlets, wherein the carotenoid has a particle size of less than 0.1 micron; the process comprises forming a solution of a carotenoid and an antioxidant in a volatile organic solvent for the carotenoid; forming an aqueous solution of sodium lauryl sulfate, water-soluble protective colloid, a preservative and a stabilizer, and adjusting said solution to a pH of about 10 to 11; forming an emulsion by mixing both solution; evaporating the organic solvent; adjusting the solids content of the emulsion using water; forming the emulsion into droplets; collecting the droplets in a powdery starch material to obtain the beadlets.

U.S. Pat. No. 9,981,899 discloses a particulate composition comprising an oil component, coenzyme Q10, and a matrix of polymer, surfactant, sugar, and yeast that forms oil-in-water emulsion composition. The emulsion is further spray dried with hot air to give a particulate composition.

SUMMARY

Solid compositions of fat soluble nutrients known in the art are prepared by extrusion spheronization, powder-catch, starch-catch, or spray-drying processes and it is observed that such processes are time consuming, need specialized industrial equipment and do not produce stable compositions with desired solubility properties, which are soluble in water and a physiological medium. Specifically as fat soluble nutrients exhibit very poor solubility in water, their use is limited to applications in lipophilic environments. Therefore it is an unmet need to formulate robust compositions of fat soluble nutrients with desired stability, solubility, and dispersibility characteristics.

Applicant has carried out rigorous experiment trials for optimization of excipient selection such as water soluble polymer and at least one nutraceutically acceptable excipient along with organic solvent and their ratios with fat soluble nutrient. During the process optimization it was found that, the intermediate product obtained at a specific stage was stable, significantly amorphous and exhibited desired dispersibility in aqueous medium. The process was further optimized for conversion of intermediate aqueous mixture to solid beadlet end product by layering on inert core. Both the products were characterized well and evaluated using different analytical techniques. The stabilized compositions are comprised of fat soluble nutrients embedded in effective amounts of water soluble polymer and at least one nutraceutically acceptable excipient, obtained in the form of intermediate microparticulate aqueous product which is significantly amorphous and the solid end product in the form of beadlets, which have their application in formulating in different dosage forms, which is nowhere reported in the prior art. None of the prior art has reported such type of stabilized compositions of fat soluble nutrients.

A process for preparation of a stabilized composition is described herein, where a solution of fat soluble nutrient(s) and antioxidant(s) in an organic solvent are added to an aqueous polymer phase and subjected to evaporation to obtain a significantly amorphous microparticulate mixture. This mixture is free of organic solvent and is stable over desired time period. Thus the process provides a stabilized intermediate aqueous product, as well as a solid end product, which can be formulated in various dosage forms as per the consumer requirement. Such compositions are soluble and dispersible in water and are prepared using common industrially equipment and are useful as dietary supplements and also for various health applications.

In an embodiment, a stabilized composition comprises a fat soluble nutrient, a water soluble polymer, and at least one nutraceutically acceptable excipient.

In an embodiment, a stabilized composition of fat soluble nutrient(s) is formed as an intermediate aqueous product or as a solid end product during the process.

In an embodiment, a composition of fat soluble nutrient(s) is in the form of a microparticulate intermediate mixture, which is substantially solvent free, significantly amorphous, and stable over a prolonged time period.

In an embodiment, a composition of fat soluble nutrient(s) is in the form of solid end product, which is stable and can be formulated as per the consumer requirement.

In an embodiment, a stabilized microparticulate mixture herein is significantly amorphous, soluble, and dispersible, and can be formulated in desired dosage form for end use.

In an embodiment, a stabilized composition of a fat soluble nutrient includes a substantially solvent free aqueous microparticulate mixture layered onto an inert core, for example to obtain a solid stable beadlet, which can be formulated as per consumer requirement.

In an embodiment, a process for preparation of stabilized fat soluble nutrient(s) comprises the use of a water soluble polymer and at least one nutraceutically acceptable excipient.

In an embodiment, a process for preparation of stabilized fat soluble nutrient compositions includes a solution of fat soluble nutrient(s) and at least one nutraceutically acceptable excipient in organic solvent added to an aqueous polymer phase and then subjected to evaporation to obtain an amorphous microparticulate mixture.

In an embodiment, a process is provided for the preparation of a significantly amorphous microparticulate mixture which is substantially free of organic solvent and is stable over prolonged storage period.

In an embodiment, a stabilized intermediate product herein is in the form of a microparticulate mixture, which is comprised of a fat soluble nutrient embedded in an effective amount of water soluble polymer, and can be formulated in the dosage form such as beverages or soft gelatin capsules.

In an embodiment, a stabilized and significantly amorphous microparticulate mixture can be coated on a suitable inert core to obtain stable beadlet(s) for formulating as per consumer requirement.

In an embodiment, a process is provided for the preparation of a stabilized and soluble composition(s) of fat soluble nutrient(s), which is easy and employs routine industrial equipment.

In an embodiment, a stabilized and soluble composition of fat soluble nutrient(s) is described, and which is useful for human consumption for various health applications related to eye health, skin health and brain health.

DETAILED DESCRIPTION

A stabilized composition of fat soluble nutrient(s) are comprised of water soluble polymer and at least one nutraceutically acceptable excipient, and are obtained in the form of an intermediate microparticulate aqueous mixture in which a fat soluble nutrient is entrapped in an effective amount of water soluble polymer, thus resulting into a stable product with improved dispersibility. The compositions described herein are stable and can be formulated in variety of dosage forms as per consumer requirement. Stabilized compositions exhibit good solubility and dispersibility and are comprised of 1-50% by weight of fat soluble nutrients embedded in water soluble polymer and at least one nutraceutically acceptable excipient. The process for preparation of stabilized compositions is simple and makes use of commonly employed industrial equipment.

As used herein, the term 'fat soluble nutrient' refers to the nutrient(s) and/or active(s) from a natural source which are lipophilic, meaning soluble only in fats. Such nutrients exhibit very poor solubility in aqueous or physiological medium. These are waxy or oily in nature, thus difficult to handle and formulate in free flowing solid dosage forms. Being lipophilic, they are very poorly absorbed in the body systems, thus exhibiting very low bioavailability. These nutrients are prone to thermal and oxidative degradation. Thus it is challenging to prepare stable and soluble formulations of fat soluble nutrients.

Non-limiting examples are carotenoids, fat soluble vitamins, fatty acids, glycerides, capsaicin, curcumin, coenzyme Q10, Terminalia, Salacia, either alone or the mixtures thereof.

Preferably the fat soluble nutrient is selected from the group such as, but not limited to, carotenoids (especially alpha-carotene, beta-carotene, 8'-apo-beta-carotenal, 8'-apo-beta-carotenoic acid esters such as the ethyl ester, canthaxanthin, astaxanthin, astaxanthin ester, betacryptoxanthin, lycopene, lutein, lutein (di) ester, zeaxanthin or crocetin, mesozeaxanthin, alpha or beta-zeacarotene or mixtures thereof), vitamins (A, D, E, K, CoQ 10) or derivatives thereof (such as their acetates, e.g. vitamin A acetate or tocopherol acetate, or their longer chain fatty acid esters, e.g. vitamin A palmitate or tocopherol palmitate), capsaicin, dihydrocapsaicin, derivatives thereof, polyunsaturated fatty acids (PUFAs) or derivatives thereof, and triglycerides rich in polyunsaturated fatty acids such as eicosapentaenoic acid (EPA), docosahexaenoic acid (DHA) or gamma-linolenic acid (GLA), Omega 3, Omega 6 oils or derivatives thereof, ethanolic extracts of Terminalia, Salacia, and/or mixtures thereof.

In an embodiment, an amount of fat soluble nutrient can range from 1-50% by weight of the total composition. Preferably fat soluble nutrient can be used in percent ranging from 5 to 30% by weight of the total stabilized composition.

It will be appreciated that "% by weight of the total stabilized composition" herein may be relative to and applicable to both the intermediate microparticulate aqueous mixture as being the stabilized composition, and also the solid beadlets as the stabilized composition depending on the composition described.

As used herein, the term 'water soluble polymer' refers to polymer(s) which dissolve in water to give a clear solution. These polymers are insoluble in organic solvents which are used for dissolving fat soluble nutrients. These polymers are used in 'effective amounts' which are nothing but the specific/sufficient amounts so that the ratio of fat soluble nutrient to water soluble polymer helps to embed the lipophilic nutrient in the polymers. Specifically starches and polysaccharides in some embodiments herein may be used as 'water soluble polymers'.

Water soluble polymers herein are selected from the group of, but not limited to starch and starch derivatives such as corn starch, potato starch, pregelatinized starch, dextrins, acid-treated starch, alkaline-treated starch, bleached starch, oxidized starch, enzyme-treated, monostarch phosphate, distarch phosphate, phosphated distarch phosphate, acetylated distarch phosphate, starch acetate, acetylated distarch adipate, hydroxypropyl starch, hydroxypropyl distarch phosphate, hydroxypropyl distarch glycerol, starch sodium octenyl succinate, acetylated oxidized starch and maltodextrin, or combinations thereof.

Said polymers can be also selected from the group of, but not limited to, gums such as pectin alginate, carrageenan agar, gum arabic, gum tragacanth, gum karaya, gum ghatti, gum guar, Locust bean gum, Tara gum, Xanthan gum, Gellan gum and Welan gum or the combination thereof; sugars such as fructans, sucrose, glucose and fructose or combinations thereof.

As used herein, the term 'at least one nutraceutically acceptable excipient' means an excipient which is food grade and safe for human consumption, and which can be added in the compositions herein in specific percentages and which aid the formulation process. At least one nutraceutically acceptable excipient can be selected from the group of antioxidant, organic solvent, inert core, coating polymer, film former, antiglidant, diluent, and combinations thereof.

As used herein, the term 'microparticulate mixture' refers to the solvent free mixture of fat soluble nutrient evenly distributed in aqueous solution of water soluble polymer and antioxidant. Such mixture is significantly amorphous, as crystallinity is lowered down to a considerable level, due to embedding of solubilized fat soluble nutrient in water soluble polymer. This mixture with significantly amorphous nature has particles in micron range and it exhibits excellent stability and solubility. The stabilized microparticulate mixture can be layered on inert beadlet, to get free flowing stable solid beadlets. Stabilized microparticulate mixture can also be used as such in the form of sachet or formulated in dosage forms such as beverages or suspensions to be filled in soft gelatin capsules.

As used herein, the term 'stabilized' refers to the composition which is stable during shelf life; such that assay of active does not fall below the labeled amount and remains within acceptable limits of active content, as analyzed during accelerated stability studies during a period of 3 months. The compositions are found to be stable when the composition is stored in any packaging system such as for example a high-density polyethylene (HDPE) container, Alu Alu packs, blister packs and all other packaging materials acceptable for storage of dietary supplements over shelf life.

In an embodiment, a stabilized composition of fat soluble nutrient is comprised of a water soluble polymer and at least one nutraceutically acceptable excipient such as antioxidant, inert core, solvent, diluent, glidant and the like. The composition can be either in the form of intermediate microparticulate mixture which can be used as such or can be further processed to prepare beadlets by layering the microparticulate mixture on an inert core. Both the intermediate as well as final form of compositions are stable over a prolonged time period. The stabilized compositions can be formulated in a variety of dosage forms as per the consumer requirement.

In an embodiment, the ratio of fat soluble nutrient to water soluble polymer can be varied from 1:0.5 to 1:10, or 1:0.75 to 1:5, preferably the ratio of fat soluble nutrient to water soluble polymer can be 1:1 to 1:3. A solution of fat soluble nutrient in organic solvent is mixed with aqueous solution of water soluble polymer and the organic solvent is evaporated off from the system, thus the fat soluble nutrient is embedded uniformly in water soluble polymer in substantially amorphous form. The polymer selected is completely soluble in water; but insoluble in the organic solvent used for dissolving the fat soluble nutrient.

As used herein, the term "substantially solvent free" refers to a composition which has very low levels of residual solvent such as below 25 ppm, which makes it safe for human consumption and acceptable for nutraceutical applications. In an embodiment, compositions described herein are substantially solvent free and safe for consumption.

In an embodiment, an organic solvent used is selected from the group of, but not limited to non-polar solvent such as methylene dichloride, hexane, and ethyl acetate. This solvent should be immiscible with water used for dissolving the polymer. The ratio of the active to solvent can be from 1:5 to 1:50, further the ratio can also range from 1:10 to 1:40. More preferably the ratio of fat soluble nutrient can also range from 1:20 to 1:30.

In an embodiment, the antioxidant is selected from the commonly used excipients including, but not limited to α-Tocopherol, β-Tocopherol, γ-Tocopherol, mix Tocopherol, citric acid, Rosemary extract, ascorbyl palmitate, sodium ascorbate or the like and combinations thereof. The amount of antioxidant used can range from 1 to 5% by weight of the total stabilized composition.

Processes for preparation of two types of stabilized compositions are described. The first type of product can be intermediate microcparticulate amorphous aqueous product obtained after removal of organic solvent from the emulsion. Another type of product can be obtained by coating or layering the intermediate microparticulate aqueous product on an inert core to form solid beadlets.

According to one embodiment, a fat soluble nutrient is dissolved in an organic solvent and antioxidant is added to this solution. The solution may be warmed to obtain a clear solution. Water soluble polymer is dissolved in water under constant stirring to obtain a clear solution; the system may be heated if required. An organic phase of the fat soluble nutrient in solvent is then added to an aqueous polymer phase with stirring. Particle size of the resulting emulsion is reduced to below 1 micron by milling using conventionally used equipment such as high pressure homogenizer, colloid mill, ball mill, microfluidizer, agitator bead mill, high energy co-mill. Organic solvent is then removed from the emulsion using evaporator to get substantially solvent free intermediate microparticulate aqueous product. The temperature range applied during evaporation can be from 60 to 70° C.

According to one embodiment, types of evaporators such as Agitated Thin Film Evaporator (ATFE), Wiped Film Evaporator (WFE), Falling Film Evaporator (FFE), and Forced Circulation Evaporator (FCE) can be used for evaporation of organic solvent from the emulsion.

Solvent removal from the emulsion results in particle size of less than 1 micron, preferably 0.2 to 0.8 microns and more preferably 0.4 to 0.7 micron. Stability of resulting significantly amorphous aqueous microparticulate mixture is checked. This mixture is the first type of stabilized composition in which fat soluble nutrient is entrapped well in water soluble polymer and is converted into amorphous microparticulates because of evaporation of organic solvent from the emulsion.

First intermediate microparticulate amorphous aqueous mixture can be further layered on an inert core to form beadlets, which can be dried and stored as such in suitable packaging material.

In one embodiment, the inert core may be comprised of any material that does not react with the fat soluble nutrient. It can be selected from non-pareil seeds made of carbohydrates such as sugar, mannitol, starch, sago, or microcrystalline cellulose. More preferably, the core used may be seeds such as sugar spheres, mannitol spheres, or the like. The inert core can generally be in the form of a sphere. Non-pareil seeds such as sugar spheres or globules, without the active ingredient, on which the active ingredient is coated, are a convenient form for the preparation of oral dosage forms such as tablets or hard gelatin capsule, of the active ingredient. The beadlets produced by coating the active ingredient on the non-pareil seeds are uniformly spherical in nature. The temperature used during layering of inert core can range from 60 to 70° C. The active ingredient loaded beadlets, having generally spherical shape, may further be uniformly coated with a polymeric material to either provide additional protection, or enhance solubility or modify the release or mask the bitter taste of the active as per the requirement.

According to one embodiment, process for preparation of stabilized beadlets can load very low to high solid content on inert core, which can be in the range of 1-60%, preferably 8 to 50% or most preferably 18-30%. Thus processes herein can be applicable to wide range of active solid content, thus broadening its industrial applicability, with respect to solubility of fat soluble nutrient, type of solvent and the type and amount of water soluble polymer used for embedding the fat soluble nutrient. The particle size of final beadlets can be in the range of 200-1000 microns, preferably the beadlets can also be in the range of 500-700 microns.

As per one embodiment, dried beadlets may be further coated with cellulose polymers, polysaccharides and gums either alone or in combination to get final stable beadlet product. The mixture of cellulose polymers: polysaccharides can also be used either alone or in combination, in the ratio of 1:0.5 to 1:3, more preferably the mixture can be used in the ratio of 1:1 to 1:2 to get stable and soluble beadlets.

Coating polymers for beadlets may be selected from, but not limited to celluloses such as alkyl cellulose (methyl cellulose), a hydroxyalkyl cellulose (e.g., hydroxymethyl cellulose, Hydroxypropyl cellulose), carboxyalkyl cellulose (e.g., carboxymethyl cellulose and alkali metal salts thereof, such as sodium salts), a carboxyalkylalkyl cellulose (e.g., carboxymethylethyl cellulose), carboxyalkyl cellulose ester (e.g., carboxymethyl cellulose butyrate, carboxymethyl cellulose propionate, carboxymethyl cellulose acetate butyrate and carboxymethyl cellulose acetate propionate) or combinations thereof;

polyacrylates such as polymethacrylate, a methacrylate copolymer (e.g., a methacrylic acid-methyl methacrylate copolymer, dimethylaminoethyl methacrylate-butyl methacrylate-methyl methacrylate copolymer, and a diethylaminoethyl methacrylic acid-methyl methacrylate copolymer), and an ethacrylate copolymer (e.g. methacrylic acid ethacrylate copolymer) or the combination thereof; povidones such as polyvinyl pyrrolidone, polyvinyl acetate ester (e.g., polyvinyl acetate phthalate (PVAP), and polyethylene glycol polyvinylacetate copolymer (e.g. polyethylene glycol-polyvinylcaprolactam-polyvinylacetate copolymer) or combinations thereof;

starch and starch derivatives such as corn starch, potato starch, pregelatinized starch, dextrins, acid-treated starch, alkaline-treated starch, bleached starch, oxidized starch, enzyme-treated, monostarch phosphate, distarch phosphate, phosphated distarch phosphate, acetylated distarch phosphate, starch acetate, acetylated distarch adipate, hydroxypropyl starch, hydroxypropyl distarch phosphate, hydroxypropyl distarch glycerol, starch sodium octenyl succinate, acetylated oxidized starch and maltodextrin or combinations thereof;

gums such as pectin alginate, carrageenan agar, gum arabic, gum tragacanth, gum karaya, gum ghatti, gum guar, Locust bean gum, Tara gum, Xanthan gum, Gellan gum and Welan gum or combinations thereof;

sugars such as fructans, sucrose, glucose and fructose or combinations thereof.

As per one embodiment, the coating can serve different purposes within the context of current invention. The coating can be non-functional and act as the medium for creating a smooth outer surface of the beadlets for further coating process. According to other embodiments, the coating can also provide additional protection to the beadlets from environmental oxidation, moisture ingress or from photo degradation, thus offering improved stability. In some embodiments, the coating can also add to the solubility of the beadlets or act as a functional coating to modulate the release profile of fat soluble nutrients based on type of coating material used in the coating. The coating can be applied in the percentage range of 5-25% on solid beadlets. It will be appreciate that this percentage range is in relation to a final solid dosage form, for example solid beadlets.

According to one embodiment, both compositions-intermediate aqueous microparticulate mixture as well as the solid beadlet product are stable for prolonged time period in packaging materials like High density Polyethylene (HDPE), polyethylene terephthalate (PET), Borosilicate Glass Bottles, Alu-Alu pack.

Intermediate microparticulate mixture can be significantly amorphous in nature, substantially solvent free and exhibits desired stability and solubility; which makes it suitable for its use in beverage formulations, suspensions or can be filled in sachets, soft gelatin capsules and the like as per consumer requirement.

Other stabilized compositions herein can be obtained by layering the substantially solvent free intermediate microparticulate mixture on inert cores to prepare beadlets which can be used in variety of dosage forms such as tablets, capsules or sachets and the like as per the requirement for end use.

In some embodiments, stable intermediate microparticulate product and solid beadlet end product was characterized for crystallinity, particle size, stability, solubility, leaching property and dispersibility by using suitable analytical techniques. Various analytical techniques such as DSC, XRD, and SEM were used for characterization and the results are documented in the experiment section. It was found that the compositions described herein are stable in different packaging materials, significantly amorphous in nature, substantially free of organic solvent and have good dispersibility in water. The solid beadlets are spherical in nature and the fat soluble nutrient is entrapped well in effective amount of water soluble polymer. Both compositions can be formulated in suitable dosage form for human consumption in various health applications like eye health, skin health and brain health.

The following examples are given by the way of illustration and therefore should not be construed to limit the scope of the disclosures or innovations herein.

While the compositions and process for preparation have been described in terms of illustrative embodiments, certain modifications and equivalents will be apparent to those skilled in the art and are intended to be included within the scope of the compositions and the processes herein. The details and advantages of which are explained hereunder in greater detail in relation to non-limiting exemplary illustrations.

EXAMPLES

It will be appreciated that the percentage of active ingredient in Examples 1 to 5 below is in relation to the solid dosage form, e.g. beadlets.

Example 1: Lutein and Zeaxanthin 10% Beadlets and Process for Preparation

TABLE 1

Composition of Example 1

| Sr. No | Ingredients | % w/w |
| --- | --- | --- |
| 1. | Lutein and Zeaxanthin oleoresin | 18.80 |
| 2. | Non-Pareil Seeds | 18.70 |
| 3. | Methylene Dichloride | 846.00 |
| 4. | DL-Alpha Tocopherol | 1.90 |
| 5. | Modified Starch | 33.90 |
| 6. | Glucose syrup | 7.30 |
| 7. | Sodium Ascorbate | 2.60 |
| 8. | Maltodextrin | 8.30 |
| 9. | Hydroxy propyl methyl cellulose | 8.30 |
| 10. | Talc | 0.20 |
| 11. | Purified Water | 560.0 |
| | Total batch size | 100.00 |

The Process:

a. Lutein and zeaxanthin oleoresin was dissolved in methylene chloride and DL-alpha tocopherol was added to it by stirring. The solution was kept in water bath at a temperature of 38-39° C. This solution was filtered and cooled for further processing.

b. Modified starch was added in purified water under constant stirring to form a clear solution. The solution was further heated under stirring to obtain a clear translucent solution and cooled to ambient temperature.

c. The solution obtained from step (a) was added to the translucent solution of step (b) under stirring. The resulting solution was milled using rotor stator for 10 minutes and it was passed through high pressure homogenizer to reduce the particle size below 1.0 micron.

d. Solvent methylene dichloride was removed from the mixture using evaporator multiple times to reduce the solvent content to the acceptable level, which results in the intermediate aqueous microparticulate mixture.

e. The intermediate aqueous microparticulate mixture from step (d) was sprayed on non-pariel seeds at inlet temperature of 60-65° C. and pump flow rate of 03-05 to get beadlets. After completion of spraying the beadlets were dried at 45-48° C. for 45-60 minutes till loss on drying (LOD) less than 5.0%. Resulting beadlets were further coated with mixture of hydroxypropyl methyl cellulose and glucose syrup to obtain a product which is dried to obtain the resulting beadlets.

The intermediate aqueous microparticulate mixture as well as the solid beadlets end product were characterized for particle size, stability, solubility, and dispersibility.

Example 2: Lutein and Zeaxanthin 5% Beadlets and Process for Preparation

TABLE 2

Composition of Example 2

| Sr. No | Ingredients | % w/w |
| --- | --- | --- |
| | Lutein and Zeaxanthin oleoresin | 9.10 |
| | Non-Pareil Seeds | 16.0 |
| | Methylene Dichloride | 393.3 |
| | DL-Alpha Tocopherol | 0.90 |
| | Modified Starch | 46.40 |
| | Glucose syrup | 8.30 |

TABLE 2-continued

Composition of Example 2

| Sr. No | Ingredients | % w/w |
|---|---|---|
| | Sodium Ascorbate | 2.50 |
| | Maltodextrin | 8.30 |
| | Hydroxy propyl methyl cellulose | 8.30 |
| | Talc | 0.20 |
| | Purified Water | 315.5 |
| | Total batch size | 100.00 |

The Process:

This composition was prepared using the process described in Example 1.

Example 3: Beta-Cryptoxanthin 10% Beadlets and Process for Preparation

TABLE 3

Composition of Example 3

| Sr. No. | Ingredients | % w/w |
|---|---|---|
| | Beta-cryptoxanthin oleoresin | 14.15 |
| | Non Pariel Seeds | 20.00 |
| | DL-Alpha Tocopherol | 2.12 |
| | Methylene dichloride | 106.12 |
| | Modified Starch | 41.90 |
| | Sodium Ascorbate | 2.83 |
| | Purified Water | 173.90 |
| | Hydroxy propyl methyl cellulose | 9.10 |
| | Glucose syrup | 9.10 |
| | Talc | 0.80 |
| | Batch Size | 100.000 |

The Process:

a. Beta-cryptoxanthin oleoresin was dissolved in methylene chloride and DL-alpha tocopherol was added to it by stirring. The solution was kept in water bath at a temperature of 38-39° C. This solution was filtered and cooled for further processing.

b. Modified starch was added in purified water under constant stirring to form a clear solution. The solution was further heated under stirring to obtain a clear translucent solution and cooled to ambient temperature.

c. The solution obtained from step (a) was added to the translucent solution of step (b) under stirring. The resulting solution was milled using rotor stator for 10 minutes and it was passed through high pressure homogenizer to reduce the particle size below 1.0 micron.

d. Solvent methylene dichloride was removed from the mixture using evaporator multiple times to reduce the solvent content to the acceptable level, which results in the intermediate aqueous microparticulate mixture.

e. The intermediate aqueous microparticulate mixture from step (d) was sprayed on non-pariel seeds at inlet temperature of 60-65° C. and pump flow rate of 03-05 to get beadlets. After completion of spraying the beadlets were dried at 45-48° C. for 45-60 minutes till loss on drying (LOD) less than 5.0%. Resulting beadlets were further coated with mixture of hydroxypropyl methyl cellulose and glucose syrup to obtain a product which is dried to obtain the resulting beadlets.

Example 4: Co-Enzyme Q10 Beadlets 10% and Process for Preparation

TABLE 4

Composition of Example 4

| Sr. No. | Ingredients | % w/w |
|---|---|---|
| | Co-enzyme Q 10 extract (99%) | 12.15 |
| | Methylene Dichloride | 243.00 |
| | DL-Alpha Tocopherol | 1.22 |
| | Non pareil seeds | 18.81 |
| | Modified Starch | 41.02 |
| | Glucose Syrup | 7.30 |
| | Sodium Ascorbate | 2.70 |
| | Maltodextrin | 8.30 |
| | Hydroxy propyl methyl cellulose | 8.30 |
| | Talc | 0.20 |
| | Water | 190.0 |
| | Batch Size | 100 |

The Process:

a. Co-enzyme Q 10 extract was dissolved in methylene chloride and DL-alpha tocopherol was added to it by stirring. The solution was kept in water bath at a temperature of 38-39° C. This solution was filtered and cooled for further processing.

b. Modified starch was added in purified water under constant stirring to form a clear solution. The solution was further heated under stirring to obtain a clear translucent solution and cooled to ambient temperature.

c. The solution obtained from step (a) was added to the translucent solution of step (b) under stirring. The resulting solution was milled using rotor stator for 10 minutes and it was passed through high pressure homogenizer to reduce the particle size below 1.0 micron.

d. Solvent methylene dichloride was removed from the mixture using evaporator multiple times to reduce the solvent content to the acceptable level, which results in the intermediate aqueous microparticulate mixture.

e. The intermediate aqueous microparticulate mixture from step (d) was sprayed on non-pareil seeds at inlet temperature of 60-65° C. and pump flow rate of 03-05 to get beadlets. After completion of spraying the beadlets were dried at 45-48° C. for 45-60 minutes till loss on drying (LOD) less than 5.0%. Resulting beadlets were further coated with mixture of hydroxypropyl methyl cellulose and glucose syrup to obtain a product which is dried to obtain the resulting beadlets.

Example 5: Curcumin 20% Beadlets and Process for Preparation

TABLE 5

Composition of Example 5

| Sr. No. | Ingredients | % w/w |
|---|---|---|
| | Curcumin extract (95%) | 23.15 |
| | Methylene Dichloride | 532.00 |
| | Non pared seeds | 20.00 |
| | Modified Starch | 37.35 |
| | Sodium Ascorbate | 2.70 |
| | Maltodextrin | 8.30 |
| | Hydroxy propyl methyl cellulose | 8.30 |
| | Talc | 0.20 |
| | Water | 230.0 |
| | Batch Size | 100 |

The Process:

a. Curcumin extract was dissolved in methylene chloride by stirring. This solution was filtered and cooled.

b. Modified starch was added in purified water under constant stirring to form a clear solution. The solution was further heated under stirring to obtain a clear translucent solution and cooled to ambient temperature.

c. The solution obtained from step (a) was added to the translucent solution of step (b) under stirring. The resulting solution was milled using rotor stator for 10 minutes and it was passed through high pressure homogenizer to reduce the particle size below 1.0 micron.

d. Solvent methylene dichloride was removed from the mixture using evaporator multiple times to reduce the solvent content to the acceptable level, which results in the intermediate aqueous microparticulate mixture.

e. The intermediate aqueous microparticulate mixture from step (d) was sprayed on non-pareil seeds at inlet temperature of 60-65° C. and pump flow rate of 03-05 to get beadlets. After completion of spraying the beadlets were dried at 45-48° C. for 45-60 minutes till loss on drying (LOD) less than 5.0%. Resulting beadlets were further coated with mixture of hydroxypropyl methyl cellulose and glucose syrup to obtain a product which is dried to obtain the resulting beadlets.

Example 6: Characterization of Beadlet Composition of Example 1 and 2 a. Residual Solvent Data—

The final product in the form of beadlets was analyzed by GC HSS System with FID detector (Column—Rtx-624 (30m×0.53 mm×3.0 μm) Capillary column or equivalent). Methylene dichloride levels in finished beadlets were measured.

TABLE 6

Residual solvent data for beadlet compositions

| Product Name | Methylene dichloride levels (ppm) |
|---|---|
| Example 1 | 6.8 |
| Example 2 | 4.7 |
| Example 3 | 11.8 |

It is shown that the compositions of Example 1 and 2 are substantially solvent free, safe for human consumption, and acceptable for nutraceutical applications. The residual solvents are in the range of about 4 ppm to about 12 ppm, which are well below the maximum allowed stringent limit of 25 ppm.

b. Stability Data for Example 1 Intermediate Microparticulate Product—

The intermediate product was charged in stability chamber at 40° C./75% relative humidity (RH) for 1, 2, 3, and 6 months' time points (M). Samples were removed as per time point and analyzed for the active content using High Efficiency Liquid Chromatography method.

TABLE 6

Stability data for Intermediate Product

| Packaging | Initial | 1 M | % Drop | 2 M | % Drop | 3 M | % Drop | 6 M | % Drop |
|---|---|---|---|---|---|---|---|---|---|
| HDPE Bottles | 2.73 | 2.82 | No Drop | 2.72 | 0.36 | 2.80 | No drop | 2.49 | 8.79 |
| ALUMINIUM Bottles | 2.73 | 2.64 | 3.30 | 2.51 | 8.06 | 2.66 | 2.56 | 2.64 | 3.30 |

In Table 6, "% Drop" is in relation to the amount of active present in the composition in initial sample. The values are calculated considering that the initial amount is 100% and then the amount remaining at each interval is calculated accordingly. The % Drop in the 1, 2, 3, and 6 month periods means the composition is stable and is within acceptable limits.

Intermediate microparticulate aqueous mixture composition of Example 1 was found to be stable in both the packaging materials over a period of 6 months.

c. Stability Data for Example 1 Lutein and Zeaxanthin Beadlets Product:

Lutein and Zeaxanthin beadlets were charged in stability chamber at 40° C./75% RH for 1, 2, 3, and 6 months' time points. Samples were removed as per time point and analyzed for the active content. The content of lutein was measured by High Efficiency Liquid Chromatography (Agilent 1100 Series HPLC system, Agilent Technologies Shanghai, USA). Agilent Eclipse Silica column 4.6 mm×250 mm, 5 μm column was used and an ultraviolet detector was set at 446 nm. Hexane and Ethyl Acetate was used to prepare mobile phase. Weighed amount of beadlets was added into mixture of ethanol & Ethyl acetate solvent to prepare a stock solution and sample for analysis was prepared by appropriate dilution. The sample and blank were analyzed using above method and the results are provided in Table 7.

TABLE 7

Stability data for End product- Beadlets

| Packaging | Initial | 1 M | % Drop | 2 M | % Drop | 3 M | % Drop | 6 M | % Drop |
|---|---|---|---|---|---|---|---|---|---|
| HDPE pack | 11.97 | 11.96 | 0.08 | 11.9 | 0.58 | 11.69 | 2.34 | 11.3 | 5.60 |
| Aluminum pouch | 11.97 | 11.95 | 0.17 | 11.85 | 1.00 | 11.71 | 2.17 | 11.51 | 3.84 |

Beadlet compositions were found to be stable in both the packaging materials over a period of 6 months.

d. Particle Size Measurement Before Solvent Evaporation as Well as after Solvent Evaporation of the Intermediate:

A dynamic light scattering particle size analyzer (Malvern Mastersizer 3000, Malvern Instruments Ltd, Malvern, UK) was used to estimate the mean particle size of intermediate microparticulate aqueous mixture composition of Example 1. All samples were diluted (1:10) with deionized water to prevent the effects of multiple scattering. The measurement temperature was set at 25° C.

The particle size (D90) of sample before emulsification (step b of Example 1) was found to be 0.2 to 0.5μ e. Dissolution Study:

Dissolution study of beadlet composition was performed using a USP II paddle apparatus (ETD-14lx, Electolab) [100 rpm, 37.5° C., 900 ml, DM water with 0.25% SLS in 100 mL). 300 mg of lutein beadlets were added into dissolution tester and aliquot of 10 ml was withdrawn at 0, 15, 30, and 450 min and then replaced with fresh medium. Samples were filtered and subjected to lutein analysis using UV spectrophotometer at 446 nm.

TABLE 8

Dissolution data of Lutein and Zeaxanthin Beadlet composition of Example 1

| Time Point (Min) | % Dissolution Release of Lutein |
|---|---|
| 0 | 0 |
| 15 | 75.96 |
| 30 | 90.55 |
| 45 | 99.86 |

It was observed that beadlet composition of fat soluble nutrients exhibit desired release profile and active was completely released from the composition within 45 minutes.

f. DSC and XRD Characterization of Intermediate Microparticulate Aqueous Composition of Example 1 and its Comparison with Unformulated Lutein and Zeaxanthin DSC Method:

Differential scanning calorimetry (DSC) was performed for both Lutein and Zeaxanthin active (unformulated) and intermediate aqueous composition or mixture of Example 1 samples using DSC 3 (METTLER TOLEDO). Temperature and enthalpy scale of DSC system was calibrated using Indium. Samples were separately weighed and hermetically sealed in the aluminum pans. Samples were heated at a rate of 10° C./min with continuous purging of nitrogen gas.

In FIGS. 1 to 4 below, "Lutemax_2020", "Liquid_raw" or Lutemax "stage ATFE LIQ SOL" refers to Lutein and zeaxanthin intermediate composition or product in XRD and DSC image. Also, "HPBL" and "HPBL cake" refer to Lutein and zeaxanthin unformulated.

Figure 1:
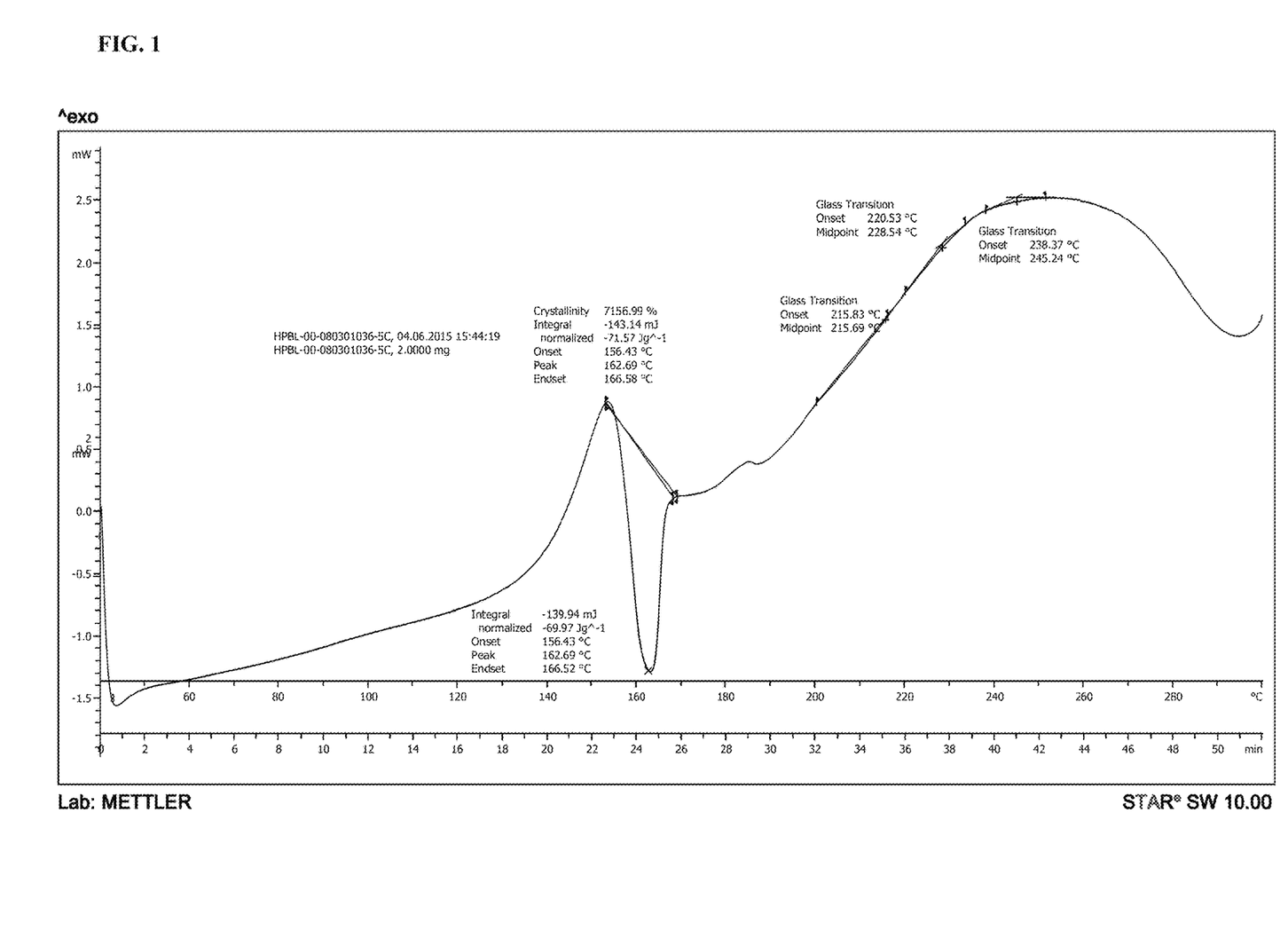
FIG. 1 shows a graph of differential scanning calorimetry (DSC) of lutein and zeaxanthin active (unformulated).

As seen from FIG. 1, DSC thermogram of Lutein and zeaxanthin active (unformulated) shows a broad endothermic peak at 162.69° C. corresponding to the melting point. The presence of a broad peak in DSC thermogram indicates presence of Lutein in crystalline form.

Figure 2:
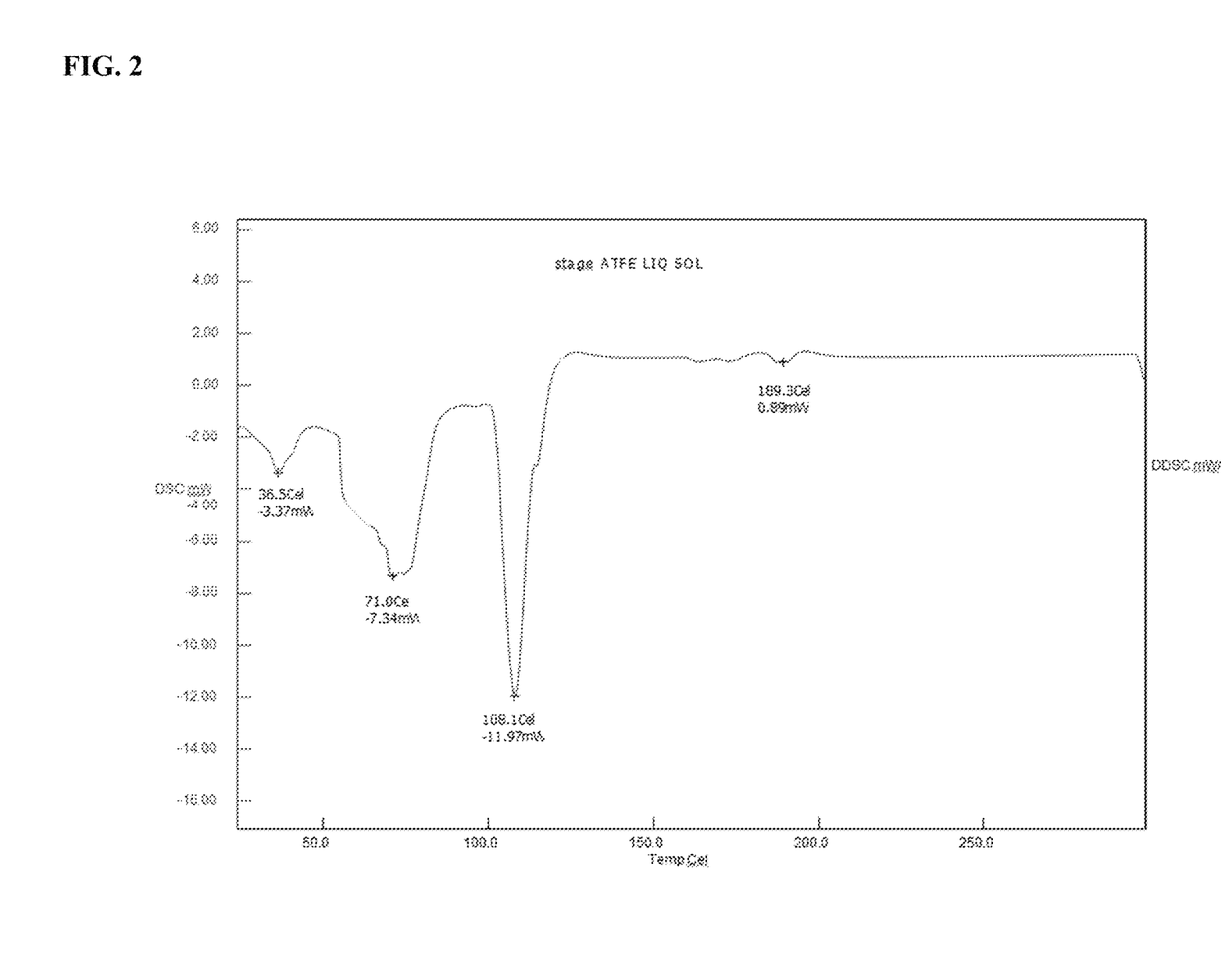
FIG. 2 shows a graph of DSC of Lutein and Zeaxanthin Intermediate Composition of Example 1.

As seen from FIG. 2, DSC thermogram of intermediate composition shows a sharp melting endothermic peak at 71.0° C. corresponding to the boiling point of water under pressure, while the peak at 108.1° C. may correspond to softening of modified starch. Lutein melting point peak shifted to 189.3° C. and considerable reduction in the intensity of endothermic peak was observed which is indicative of formation of amorphous form of Lutein and Zeaxanthin.

XRD Method:

X-ray diffraction study (XRD) was performed for both Lutein and Zeaxanthin active (unformulated) and Lutein and Zeaxanthin intermediate composition of Example 1.

Figure 3:
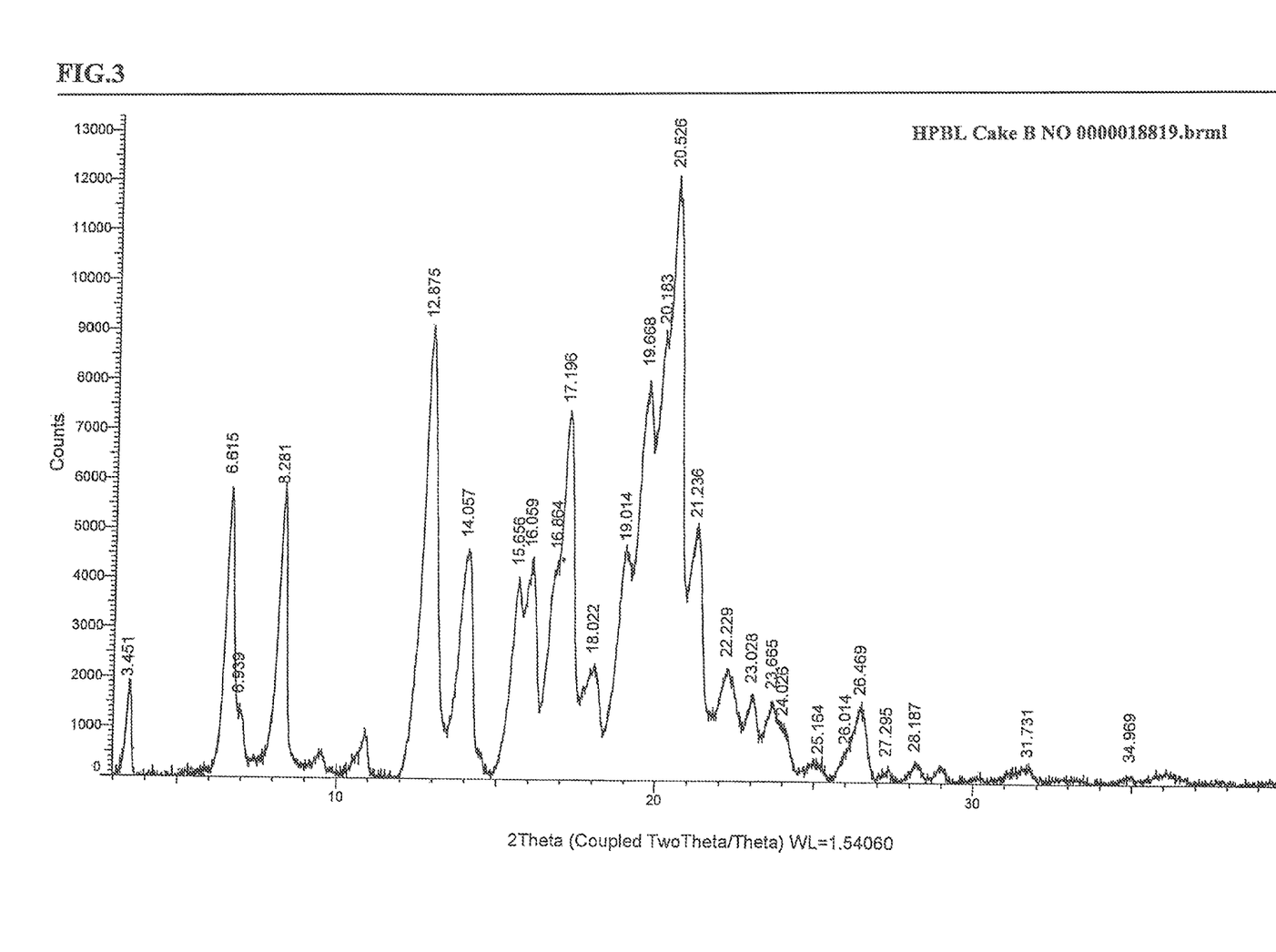
FIG. 3 shows a graph of x-ray diffraction (XRD) of lutein and zeaxanthin active (unformulated)

FIG. 3 indicates that unformulated Lutein and zeaxanthin active showed distinctive sharp peaks at ~2θ angles of 6.615, 8.281, 12.875, 17.196, 19.668, and 20.526. This confirms the well structured crystalline nature of Lutein. In FIG. 3, it will be appreciated that there may be overlapping values, for example just before Theta value 30, where the values shown (overlapping) are 28.956 and 28.991. For further reference, a Table A is provided below to show values of the peaks of FIG. 3.

TABLE A

Peak List

| Index | Angle | d Value | Net Intensity | Rel. Intensity |
|---|---|---|---|---|
| 0 | 3.451 | 25.57973 | 1688 | 14.0% |
| 1 | 6.615 | 13.35068 | 5810 | 48.2% |
| 2 | 6.939 | 12.72812 | 1389 | 11.5% |
| 3 | 8.281 | 10.66839 | 5809 | 46.5% |
| 4 | 9.488 | 9.31443 | 519 | 4.3% |
| 5 | 10.655 | 8.29651 | 503 | 4.2% |
| 6 | 10.889 | 8.11819 | 817 | 6.8% |
| 7 | 12.875 | 6.87035 | 8992 | 74.6% |
| 8 | 14.057 | 6.29507 | 4568 | 37.9% |
| 9 | 15.656 | 5.65577 | 4005 | 33.2% |
| 10 | 16.059 | 5.51477 | 4381 | 36.3% |
| 11 | 16.864 | 5.25310 | 4341 | 36.0% |
| 12 | 17.196 | 5.15257 | 7323 | 60.7% |
| 13 | 18.022 | 4.91825 | 2248 | 18.6% |
| 14 | 19.014 | 4.66378 | 4528 | 37.5% |
| 15 | 19.668 | 4.51002 | 8055 | 66.8% |
| 16 | 20.183 | 4.39624 | 8913 | 73.9% |
| 17 | 20.526 | 4.32342 | 12061 | 100.0% |
| 18 | 21.236 | 4.18056 | 5020 | 41.6% |
| 19 | 22.229 | 3.99588 | 2205 | 18.3% |
| 20 | 23.028 | 3.85910 | 1691 | 14.0% |
| 21 | 23.665 | 3.75663 | 1569 | 13.0% |
| 22 | 24.026 | 3.70096 | 1031 | 8.5% |
| 23 | 25.164 | 3.53611 | 274 | 2.3% |
| 24 | 26.014 | 3.42246 | 476 | 3.9% |
| 25 | 26.469 | 3.36473 | 1465 | 12.1% |
| 26 | 27.295 | 3.26473 | 234 | 1.9% |
| 27 | 28.187 | 3.16340 | 339 | 2.8% |

TABLE A-continued

| Peak List | | | | |
|---|---|---|---|---|
| Index | Angle | d Value | Net Intensity | Rel. Intensity |
| 28 | 28.956 | 3.08113 | 218 | 1.8% |
| 29 | 28.991 | 3.07743 | 339 | 2.8% |
| 30 | 31.731 | 2.81770 | 256 | 2.1% |
| 31 | 34.969 | 2.56387 | 171 | 1.4% |

Figure 4:
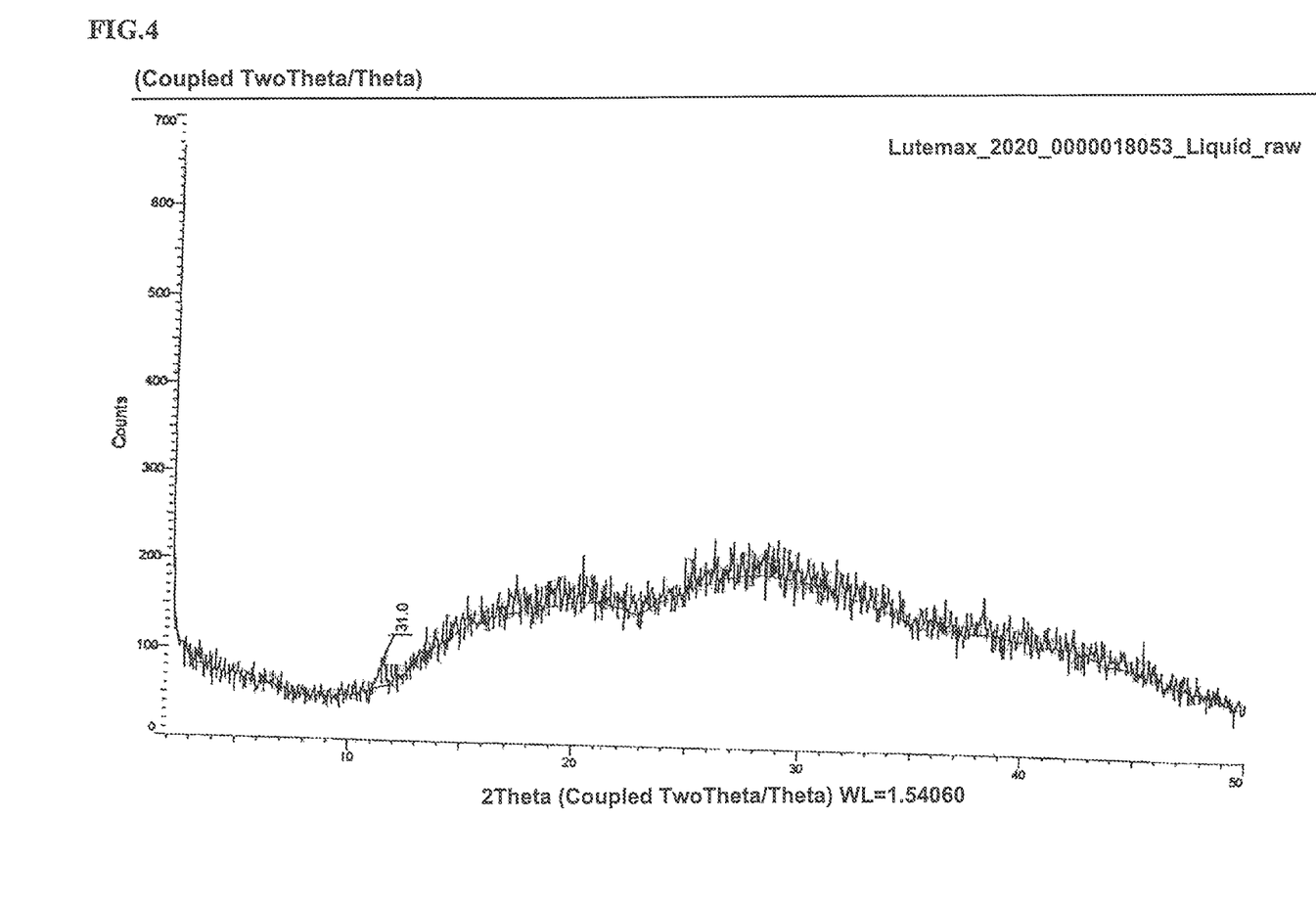
FIG. 4 shows a graph of XRD of Lutein and Zeaxanthin Intermediate Composition of Example 1.
Figure 5:
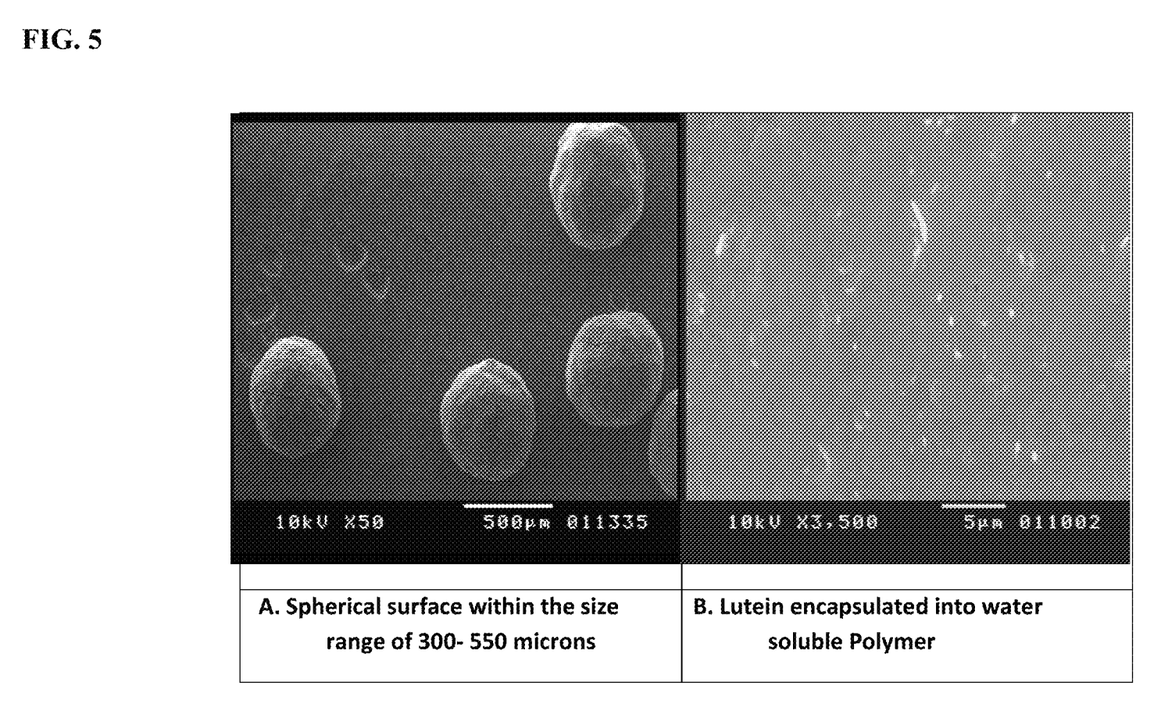
FIG. 5 shows results of scanning electron microscopy (SEM) of lutein and zeaxanthin 10% Beadlet Composition.

FIG. 4 indicates that XRD of Lutein and Zeaxanthin Intermediate composition of Example 1 showed diffuse spectra and no distinctive peaks of lutein which demonstrated absence of any crystallinity in intermediate microparticulate aqueous mixture. This was indicative of complete amorphous nature of Lutein in intermediate solution stage.

g. Characterization of Intermediate Microparticulate Aqueous Product and Beadlets for Entrapment of Fat Soluble Nutrient in Water Soluble Polymer: Scanning Electron Microscopy (SEM):

Lutein and Zeaxanthin Beadlet sample of Example 1 was mounted on double-sided tape on aluminum stubs and sputter-coated with gold/palladium, and micrographs were taken at appropriate magnification (scale factor 0.676 μm pixel-1) for a detailed visualization of the surface using JEOL JSN 5400 Scanning Microscope. Surface images were 900×900 pixels coded on 256 gray levels (black=0, white=255). See FIG. 5. In FIG. 5, A on the left side shows that spherical surface was within the size range of 300-550 microns, and B on the right side shows lutein encapsulated into water soluble polymer.

The surface fractal dimension and GLN (gray-level non-uniformity) parameter were estimated to characterize the roughness and holes appearing at the surface. The SEM surface view shows the smooth and uniform morphology which indicates uniform distribution and entrapment of Lutein and Zeaxanthin in water soluble polymer.

h. Water Solubility/Dispersibility Data for Intermediate Product and

Figure 6:
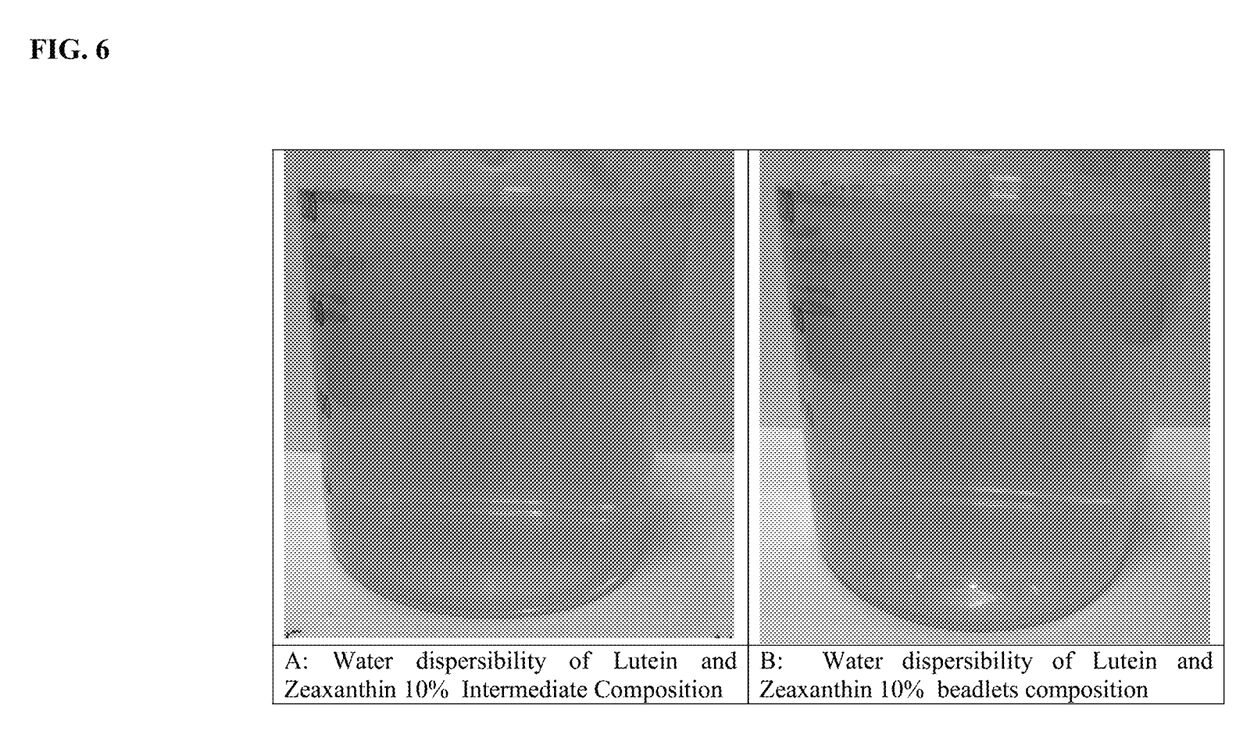
FIG. 6 shows a water dispersibility test of compositions herein.

Beadlet composition of Example 1 equivalent to 2 mg of lutein was added in 240 mL water under stirring. It was observed that the beadlets dispersed completely within 3 to 5 minutes and formed clear dispersion. In FIG. 6, the left side A shows water dispersibility of lutein and zeaxanthin Intermediate Composition of Example 1, and the right side B shows water dispersibility of lutein and zeaxanthin 10% Beadlets Composition.

i. Leaching in Methylene Dichloride of Stable Beadlets in the Invention

Figure 7:
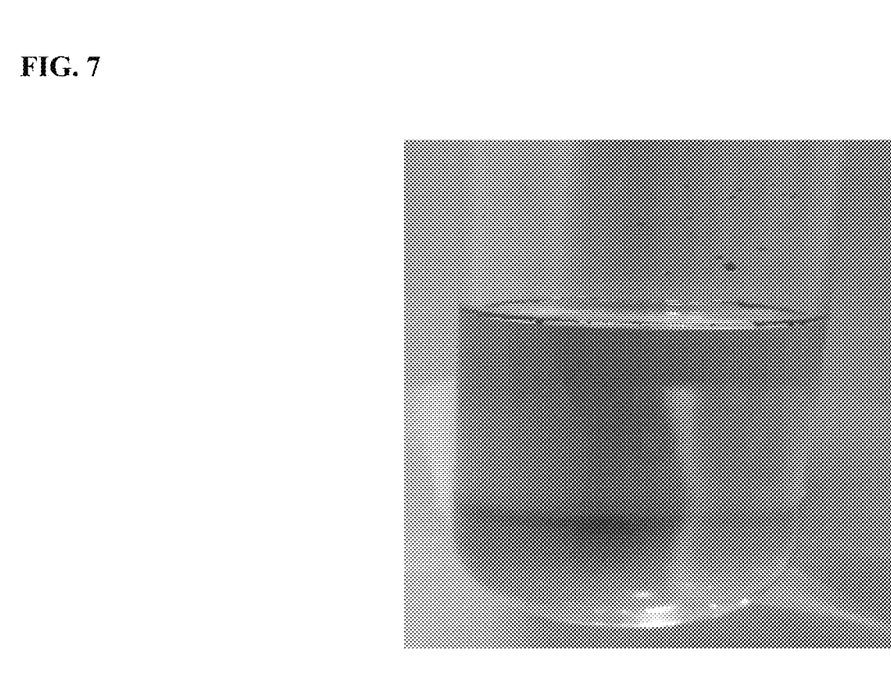
FIG. 7 shows a leaching test of a beadlet composition in methylene chloride.

Beadlet composition of Example 1 (10 mg) was added in 10 mL methylene dichloride. There was no leaching of Lutein and Zeaxanthin observed in methylene dichloride. This indicates that the fat soluble active was effectively entrapped in the matrix of water soluble polymer. See FIG. 7.

The invention claimed is:

1. A stabilized composition that is an intermediate microparticulate aqueous mixture and is suitable for layering a non-pareil seed to form a solid beadlet, wherein the stabilized composition capable of preventing oxidation of fat soluble nutrient cmoprises:

1-50% by weight of a fat soluble nutrient, wherein the fat soluble nutrient is at least one selected from the group consisting of lutein and zeaxanthin, mesozeaxanthin, beta cryptoxanthin, co-enzyme, curcumin, and an ethanolic extract of Terminalia and Salacia, a water soluble polymer, wherein the water soluble polymer is at least one selected from the group consisting of starch, pectin alginate, carrageenan agar, gum arabic, gum tragacanth, gum karaya, gum ghatti, gum guar, Locust bean gum, Tara gum, Xanthan gum, Gellan gum, Welan gum, fructan, sucrose, glucose and fructose, and a nutraceutically acceptable excipient, wherein the nutraceutically acceptable excipient is at least one selected from the group consisting of an antioxidant, an organic solvent, a coating polymer, a film former, an antiglidant, and a diluent;

wherein a ratio of an amount of the fat soluble nutrient and an amount of the water soluble polymer ranges from 1:0.5 to 1:10, and wherein the intermediate microparticulate aqueous mixture is in an amorphous form.

2. The stabilized composition of claim 1, wherein the is at least one selected from the group consisting of corn starch, potato starch, pregelatinized starch, dextrins, acid-treated starch, alkaline-treated starch, bleached starch, oxidized starch, enzyme-treated, monostarch phosphate, distarch phosphate, phosphated distarch phosphate, acetylated distarch phosphate, starch acetate, acetylated distarch adipate, hydroxypropyl starch, hydroxypropyl distarch phosphate, hydroxypropyl distarch glycerol, starch sodium octenyl succinate, acetylated oxidized starch and maltodextrin.

3. The stabilized composition of claim 1, wherein the antioxidant is at least one selected from the group consisting of α-Tocopherol, β-Tocopherol, γ-Tocopherol, mix Tocopherol, citric acid, Rosemary extract, ascorbyl palmitate, and sodium ascorbate.

4. A process of preparing an intermediate microparticulate aqueous mixture in accordance with claim 1, comprising:

a. dissolving a fat soluble nutrient in an organic solvent along with an antioxidant, to obtain a mixture, and warming the mixture to obtain a solution, wherein the fat soluble nutrient is at least one selected from the group consisting of lutein and zeaxanthin, mesozeaxanthin, beta cryptoxanthin, co-enzyme, curcumin, and an ethanolic extract of Terminalia and Salacia;

b. adding a water soluble polymer in purified water at warm temperature to obtain a translucent solution, wherein the water soluble polymer is at least one selected from the group consisting of starch, pectin alginate, carrageenan agar, gum arabic, gum tragacanth, gum karaya, gum ghatti, gum guar, Locust bean gum, Tara gum, Xanthan gum, Gellan gum, Welan gum, fructan, sucrose, glucose and fructose, and wherein a ratio of an amount of the fat soluble nutrient and an amount of the water soluble polymer ranges from 1:0.5 to 1:10;

c. mixing the solution obtained from step (a) to the translucent solution of step (b) under stirring, milling using rotor stator and passing through high pressure homogenizer to reduce particle size below 1.0 micron; and d. removing the organic solvent using an evaporator to obtain the intermediate microparticulate aqueous mixture.

5. A process of preparing solid beadlets end, comprising:

a. layering the intermediate aqueous microparticulate aqueous mixture from claim 4 on non-pareil seeds at an inlet temperature and pump flow rate to obtain beadlets;

b. drying the beadlets at 45-48° C. for about an hour; and c. coating the beadlets with a coating system and drying.

* * * * *